United States Patent

Sweet et al.

[15] 3,658,133
[45] Apr. 25, 1972

[54] AUTOMATIC DEPTH CONTROL DEVICE FOR TILLAGE UNITS

[72] Inventors: Ralph Sweet, Forgan, Saskatchewan; F. Ben Dyck, Current, Saskatchewan, both of Canada

[73] Assignee: Ralph Sweet, General Delivery, Forgan, Saskatchewan, Canada

[22] Filed: Dec. 8, 1969

[21] Appl. No.: 883,368

[30] Foreign Application Priority Data

Dec. 10, 1968    Great Britain......................58,648/68

[52] U.S. Cl..................................................172/4, 172/663
[51] Int. Cl. .........................................................A01b 63/111
[58] Field of Search ...................................172/4; 56/DIG. 15

[56] References Cited

UNITED STATES PATENTS

| 3,433,307 | 3/1969 | Gilbert | 172/4 |
| 3,136,371 | 6/1964 | Rau et al. | 172/4 |
| 2,714,346 | 8/1955 | Valin | 172/4 |
| 2,755,721 | 7/1956 | Rusconi | 172/4 |
| 2,616,350 | 11/1952 | Robinson et al. | 172/4 |
| 2,621,575 | 12/1952 | Berg | 172/4 |
| 2,473,655 | 6/1949 | Lohn | 56/214 |
| 2,750,727 | 6/1956 | Wright | 56/208 |
| 3,077,682 | 2/1963 | Small | 172/4 X |
| 2,720,716 | 10/1955 | White | 172/4 X |
| 2,787,066 | 4/1957 | Johnson | 172/4 X |

Primary Examiner—Robert E. Pulfrey
Assistant Examiner—R. T. Rader
Attorney—Fetherstonhaugh & Kent

[57] ABSTRACT

The cultivating element rock shaft has an extension actuating micro-switches in conjunction with a floating sensing arm. The micro-switches operate solenoids which control the valves connected to the hydraulic piston and cylinder assembly for raising and lowering the elements either manually or automatically.

2 Claims, 4 Drawing Figures

AUTOMATIC DEPTH CONTROL DEVICE FOR TILLAGE UNITS

This invention relates to new and useful improvements in automatic depth control means for tillage units such as discers, cultivators or the like.

The majority of tillage parts are spring-tensioned in an attempt to control the depth of penetration of the soil engaging components.

Under perfect circumstances, of course, such spring tensioning is satisfactory but there are many conditions which may vary the depth of tillage units such as a difference in compaction of soil, a difference in speed, and more importantly, a difference in weight when such tillage equipment is used for seeding or the placing of seed and fertilizer as is conventional.

For example, when using a relatively large discer with a seed box thereon, the weight with the seed box full is considerable and if the various disc gangs are preset to a certain depth, this depth gradually decreases as the seed is used up so that continuous adjustment is required by the operator in an attempt to obtain constant depth of seed or fertilizer placement.

This increase in weight also flattens the tires or causes the tires to sink into the soil once again making the optimum depth difficult to maintain.

The present device is adaptable in principle to any form of tillage implement whether it be a duck-foot cultivator, a discer, or any implement utilizing soil engaging components which are required to be maintained at a constant depth.

The essence of the invention is to provide sensing means which will measure the actual change of the disc (or tillage tool) in the soil and adjust same, whether this change in depth is a result of a variation of frame height from the surface of the soil, or a change in soil density (or soil compaction), or a change in the speed of pulling the implement. With regard to the latter, one-way type cultivators are drawn at an angle to the direction of travel so that the speed has a direct relationship upon the depth or suction of the discs. This adjustment is preferably undertaken by a combination of electric and hydraulic units as will hereinafter be described.

With relatively wide implements, it will be appreciated that one or more sensing devices will be required and simple circuitry can be used to ensure that, for example, two or more of the sensing units must indicate adjustment before adjustment actually takes place. This is to avoid slight variations in ground level or movements of individual gang sections, from operating the raising or lowering mechanism.

With the foregoing in view, and such other or further purposes, advantages or novel features as may become apparent from consideration of this disclosure and specification, the present invention consists of the inventive concept which is comprised, embodied, embraced or included in the method, process, construction, composition, arrangement of parts, or new use of any of the foregoing, herein exemplified in one or more specific embodiments of such concept, reference being had to the accompanying figures in which:

FIG. 1 is an isometric view of a conventional one-way disc type cultivator showing the sensing units at the front thereof.

FIG. 2 is a schematic view of the hydraulic circuit for automatic disc control.

FIG. 3 is a schematic diagram of the control circuit for the solenoid valves and the like.

In the drawings like characters of reference indicate corresponding parts in the different figures.

Figures 1, 2, 3:
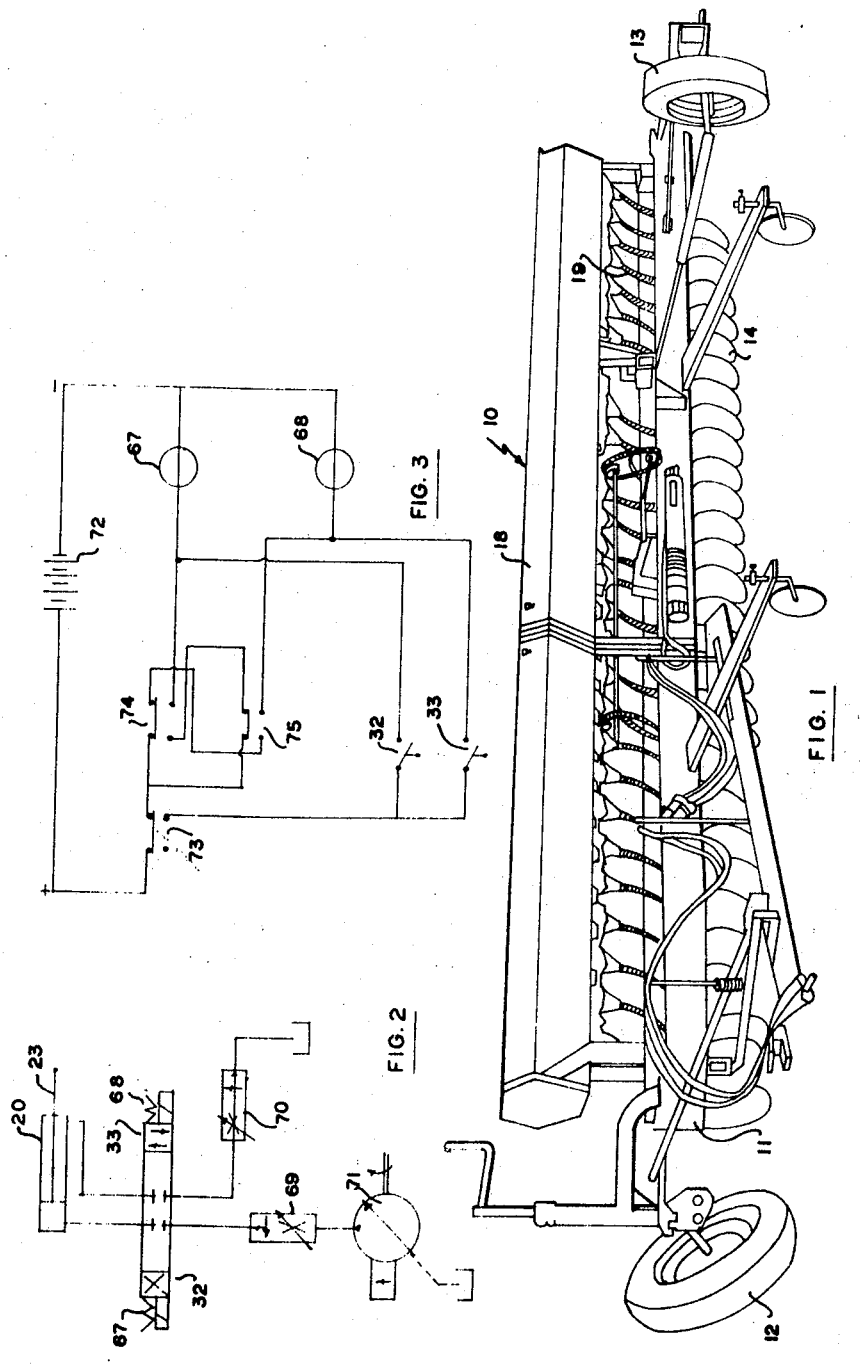

Proceeding therefore to describe the invention in detail, reference should first be made to FIG. 1 in which is shown a front partially isometric view of a conventional one-way discing assembly collectively designated 10 having a main supporting framework 11, a front ground engaging wheel 12 and a rear ground engaging wheel 13 and sets of disc gangs 14 situated behind the main supporting framework 11 and mounted upon support arms 15 (see FIG. 4), said arms being secured to a rock shaft 16 journalled for rotation within brackets 17 depending from the main frame 11.

A seed box 18 is mounted above the main frame 11 and seed feed tubes 19 extend from the box to adjacent the discs for seeding purposes as is conventional.

Figure 4:
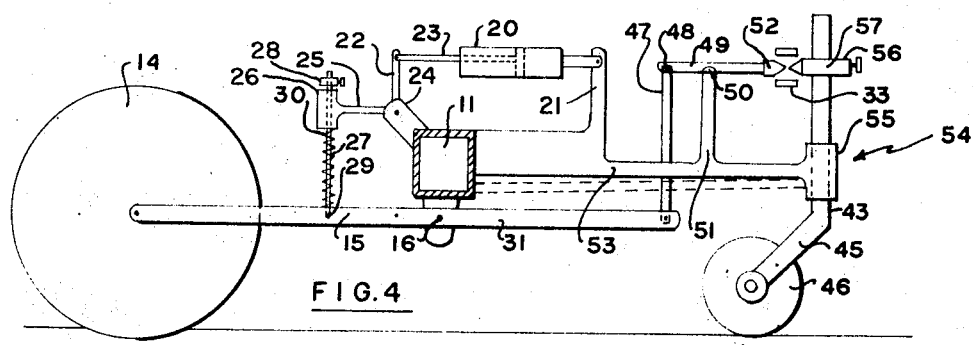
FIG. 4 is a partly schematic side elevation of the depth control mechanism on the cultivator frame.

This view is typical of the type of device to which my invention can be secured and FIG. 4 shows a partially schematic side elevation of one embodiment of the invention.

A hydraulic piston and cylinder assembly 20 is supported upon a bracket 21 extending from the frame 11 and a crank arm 22 is connected by one end thereof to the piston rod 23 of this assembly. The crank arm is journalled upon a pivot 24 supported upon framework 11 and the other arm 25 of the crank arm is provided with a sleeve bearing or slide 26.

A rod 27 is slidable within this sleeve bearing 26 and is prevented from disengagement by collar 28 secured to the upper end thereof above the bearing 26.

The lower end of this rod is pivotally connected as at 29, to the support arm 15 and a compression spring 30 extends around the rod 27 and reacts between the underside of the sleeve bearing 26 and the arm 29 thus applying downward pressure upon the arm and assisting in maintaining the discs 14 at the required depth under optimum conditions.

Extending forwardly of rock shaft 16 and secured thereto is a control arm 31 so that when the arm 15 moves upwardly, arm 31 moves downwardly and vice-versa.

As shown in FIG. 4, a link 47 is pivotally connected by the lower end thereof to the end of arm 31 and extends upwardly to be pivotally connected as at 48, to a horizontal arm 49 pivoted intermediate the ends thereof as at 50, to an upward extension 51 from the main frame 11. The end 52 of this arm 49 actuates a pair of suitably mounted micro-switches 32 or 33.

The support 51 is an extension of a forwardly extending member 53 which also carries a sensing device collectively designated 54. This places the sensing device well forward of the main frame 11 to give the optimum effect.

In this sensing device, a spindle 43 carries a wheel 46 within fork 45. The spindle floats freely within a sleeve bearing 55 carried upon the forward extension of the supporting member 53 and a collar 56 retains the spindle within the bearing. This collar 56 which is adjustable, also carries an offstanding portion 57 for actuation of the micro-switches 32 and 33.

FIGS. 2 and 3 show details of the sensing device operation. FIG. 2 shows the aforementioned piston and cylinder assemblies 20 operatively connected to the discer rock shaft or the arms mounting the discs for raising and lowering same relative to the general framework of the implement.

Also, 67 illustrates a solenoid which when energized by micro-switch 32 moves the discs upwardly relative to the frame and 68 represents a solenoid, which, when energized, moves the discs downwardly relative to the frame.

The necessary valves 69 and 70 are operated by the solenoids 67 and 68 respectively and connection the hydraulic pump 71 to one side or other of the piston within the piston and cylinder assemblies 20 thus moving disc assemblies 14 or 14A up or down as required.

FIG. 3 shows the circuitry associated with the solenoids 67 and 68 in conjunction with the tractor battery 72 and a main switch 73 which enables the device to be on automatic or manual control. It on manual control as illustrated, push buttons 74 or 75 can be actuated to complete the circuits to the solenoids 67 and 68 thus raising or lowering the discs for the preliminary or principle settings.

When on automatic, movement of either the vertical spindle 43 or the arm 31 operates either the "up" micro-switch 32 or the "down" micro-switch 33 once again actuating the solenoids 67 and 68 respectively. When the selector switch 73 is in the manual position the solenoids can be energized by the push buttons 74 or 75 as hereinbefore described. However when in the automatic position, the solenoids are energized by the micro-switches.

If the discs are going too deep, the "up" micro-switch 32 closes thus raising the discs until the correct depth is restored. Conversely if the discs are not deep enough then the "down"

micro-switch 33 closes and the discs are lowered until the correct depth once again is restored.

Various modifications can be made within the scope of the inventive concept which is herein disclosed and/or claimed.

What I claim to be the present invention is:

1. In an earth working implement, the combination of a wheeled frame, a vertically movable support arm pivoted to said frame and extending rearwardly therefrom, an earth engaging tool carried by said support arm for raising and lowering movement relative to the frame, a fluid operator mounted on the frame and operatively connected to said support arm for raising and lowering said tool, and a depth control mechanism comprising a control arm movable with and extending forwardly from said support arm, a lever pivotally mounted on said frame at a point intermediate the ends of the lever, said lever having front and rear ends, a link pivotally connecting said control arm to the rear end of said lever, a pair of vertically spaced micro-switches disposed respectively above and below the front end of said lever and selectively actuated thereby as a function of lowering and raising of said tool relative to said frame, a shaft vertically slidable in said frame forwardly of said lever, a ground engaging sensor element provided at the lower end of said shaft, and a detent provided on the upper end portion of the shaft, said detent being disposed between said vertically spaced micro-switches for selectively actuating the same as a function of raising and lowering of said frame relative to the ground, and means operatively connecting said micro-switches to said fluid operator for actuating the latter selectively in opposite directions.

2. The device as defined in claim 1 which is further characterized in that said detent is vertically adjustably mounted on said shaft.

* * * * *